United States Patent
Lerche et al.

(10) Patent No.: US 10,061,043 B2
(45) Date of Patent: Aug. 28, 2018

(54) APPARATUS AND METHOD FOR THE EVALUATION OF GAMMA RADIATION EVENTS

(71) Applicant: KONINKLIJKE PHILIPS N.V., Eindhoven (NL)

(72) Inventors: Christoph Werner Lerche, Herzogenrath (DE); Sarah Lodomez, Aachen (DE); Volkmar Schulz, Wuerselen (DE); Bjoern Weissler, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 248 days.

(21) Appl. No.: 14/888,567

(22) PCT Filed: Apr. 30, 2014

(86) PCT No.: PCT/EP2014/058865
§ 371 (c)(1),
(2) Date: Nov. 2, 2015

(87) PCT Pub. No.: WO2014/180734
PCT Pub. Date: Nov. 13, 2014

(65) Prior Publication Data
US 2016/0084974 A1    Mar. 24, 2016

(30) Foreign Application Priority Data
May 8, 2013    (EP) ..................................... 13167050

(51) Int. Cl.
*G01T 7/00*    (2006.01)
*G01T 1/164*   (2006.01)
*G01T 1/20*    (2006.01)

(52) U.S. Cl.
CPC ............ *G01T 7/005* (2013.01); *G01T 1/1642* (2013.01); *G01T 1/2018* (2013.01)

(58) Field of Classification Search
None
See application file for complete search history.

(56) References Cited

U.S. PATENT DOCUMENTS

| | | |
|---|---|---|
| 3,878,373 A | 4/1975 | Blum |
| 4,437,160 A | 3/1984 | Blum |

(Continued)

FOREIGN PATENT DOCUMENTS

WO    2012005767    1/2012

OTHER PUBLICATIONS

Craig S. Levin, et al., "Current Trends in Preclinical PET System Design", Position Emission Tomography, PET Clin 2 (2007) 125-160, 2007 Elsevier Inc.

(Continued)

*Primary Examiner* — Yara B Green

(57) ABSTRACT

The invention concerns an evaluation apparatus (50) for evaluating gamma radiation events detected by a gamma camera (10) and identifying valid gamma radiation events, said (gamma camera (10) including a scintillator (12) for emitting scintillation photons (42) at photo conversion positions (44) in the scintillator (12) in response to incident gamma rays (22) and resulting gamma radiation events and a position-sensitive photodetector(14) for detecting emitted scintillation photons (42) and obtaining therefrom a spatial signal distribution (24). The invention further concerns a calibration apparatus (56) for in-situ calibrating a position-sensitive photodetector (14) of a gamma camera (10) for the detection of gamma radiation events.

20 Claims, 11 Drawing Sheets

(56) References Cited

U.S. PATENT DOCUMENTS

| | | |
|---|---|---|
| 4,507,733 A | 3/1985 | Blum |
| 5,285,072 A | 2/1994 | Klingenbeck-Regn et al. |
| 5,293,044 A | 3/1994 | Klingenbeck-Regn et al. |
| 6,452,164 B1 | 9/2002 | Andarawis et al. |
| 6,835,935 B2 | 12/2004 | Engdahl et al. |
| 7,071,474 B2 | 7/2006 | Wong et al. |
| 8,119,980 B2 | 2/2012 | Malmin et al. |
| 2003/0156684 A1* | 8/2003 | Fessler ............... A61B 6/032 378/210 |
| 2005/0197564 A1* | 9/2005 | Dempsey ............ A61B 5/055 600/411 |
| 2006/0151707 A1 | 7/2006 | Wellnitz et al. |
| 2007/0138396 A1* | 6/2007 | Park ................... G01T 1/2985 250/363.04 |
| 2008/0086026 A1* | 4/2008 | Keppel ............... A61N 5/1015 600/3 |
| 2010/0044571 A1* | 2/2010 | Miyaoka ............. G01T 1/1642 250/362 |
| 2010/0102240 A1 | 4/2010 | Fukuchi et al. |
| 2010/0316275 A1 | 12/2010 | Stolin et al. |
| 2011/0015904 A1 | 1/2011 | Fenchel et al. |
| 2011/0192982 A1* | 8/2011 | Henseler ............ G01T 1/2985 250/362 |
| 2011/0278443 A1 | 11/2011 | Mizuta et al. |
| 2012/0153165 A1* | 6/2012 | Ott ..................... G01T 1/2935 250/362 |

OTHER PUBLICATIONS

Wu, et al., "A Multiplexer Design for Position-Sensitive Avalanche Photodiode Detectors in a PET Scanner", IEEE Transactions on Nuclear Science, vol. 55, No. 1, Feb. 2008.

McKinsey D N et al: "Neutrino detection with CLEAN", Astroparticle Physics, Elsevier BV, NL, vol. 22, No. 5-6,Jan. 1, 2005 (Jan. 1, 2005), pp. 355-368, XP027802544, ISSN: 0927-6505.

Lerche, C.W., et al."Maximum likelihood based positioning and energy correction for pixelated solid-state PET detectors", Nuclear Science Symposium and Medical Imaging Conference (NSS/MIC, 2011, XP002711891).

G. Germano, et al., "An Investigation of Methods of Pileup Rejection for 2-D Array Detectors Employed in High Resolution PET". Division of Nuclear Medicine and Biophysics, UCLA School of Medicine and Laboratory of Nuclear Medicine, University of California, Los Angeles 90024, 90CH2957-I/90/0000-1263$01.00 1990 IEEE.

* cited by examiner

APPARATUS AND METHOD FOR THE EVALUATION OF GAMMA RADIATION EVENTS

CROSS-REFERENCE TO PRIOR APPLICATIONS

This application is the U.S National Phase application under U.S.C. § of international Application No. PCT/EP2014/058865, filed on Apr. 30, 2014, which claims the benefit of European Patnet Application No. 13167050.7, filed on May. 8. 2013. These applications are hereby incorporated by reference herein.

FIELD OF THE INVENTION

The present invention relates to an evaluation apparatus, a calibration apparatus, a nuclear imaging device and corresponding methods for the use in nuclear imaging, in particular for the use with PET and SPECT cameras.

BACKGROUND OF THE INVENTION

Gamma ray detection with gamma cameras for nuclear imaging is a multiple stage process. First, the incident gamma photon is converted to a scintillation light flash (i.e. a scintillation photon). Then, each of the visible light photons from this flash (sometimes ultraviolet or other photons may be generated) is captured with a photodetector and a spatial signal distribution is obtained, which is then used to estimate the energy of the incident gamma photon and the two- or three-dimensional position of the gamma ray photo conversion. This determined position then forms the basis for the estimation of a line of response (LOR) and the image reconstruction from a nuclear decay process.

While the energy of the gamma photon is proportional to the number of detected visible light photons, the photo conversion position (i.e. the position where the gamma ray interacts with the scintillator and the light flash is created) may be extracted from the spatial distribution of the visible light photons. One possibility is to couple each element of the scintillator to a single photodetector element. All the light is collected by this single photodetector element and the position of the gamma ray impact is given by the position of the photodetector. This type of readout is generally called one-to-one coupling.

Because one-to-one coupling usually requires a large number of digitization channels, light-sharing is often used, which refers to a light-guide interposed in between the scintillator and the photodetector. In this way, the scintillation light from the photo conversion is distributed over several photodetector elements and the number of required digitization channels is reduced considerably. After digitization of the charge pattern, i.e. based on the spatial signal distribution, energy and position are computed from the values. The most widely used method is centroid computation (also called anger method or centre of gravity (COG)). Alternatively, maximum likelihood (MLE) estimation can be used (Lerche, C. W. et al.; "Maximum likelihood based positioning and energy correction for pixelated solid-state PET detectors"; Nuclear Science Symposium and Medical Imaging Conference (NSS/MIC), 2011 IEEE). This method is based on the calculation of the likelihood of a photo conversion position in the scintillator for a given observed charge pattern at the photodetector. The position with the highest likelihood value is chosen.

Both, COG positioning and MLE positioning work fine and result in reasonable position estimates, as long as the observed gamma radiation events all result from single gamma ray impacts. However, if Gamma radiation events result from the impact of multiple gamma rays at the same time, i.e. within one sampling interval in a digital photodetector or within the integration time in an analog charge converter, (pile-up events) or from inter-crystal Compton scatter (inter-crystal Compton scatter events), the detected position might be erroneous.

Further, the recognition of gamma radiation events resulting from pile-up events or from inter-crystal Compton scatter events is difficult during normal data acquisition. One approach is to analyze the spatial position of the centroid of the detected spatial signal distribution, the rising edge of the temporal charge pulse (pulse shape discrimination) or the energy of the event.

In U.S. Pat. No. 5,293,044 (A) a method for rapid localization of a scintillation event in a gamma camera using a maximum likelihood estimator is disclosed. The method is applied in a process for localizing a scintillation event in a gamma camera having a plurality of photomultipliers forming a camera surface. Each photomultiplier generates an output signal in response to the scintillation event. According to the disclosed method, a plurality of comparative signal sets are generated from output signals of the photomultiplier corresponding to respective scintillation events of known location. Then, a location-dependent probability function is formed based on a comparison of the outputs of the photomultipliers for a scintillation event of unknown location with the comparative signal sets, and the location of the scintillation event of unknown location is defined as the location corresponding to the maximum of the probability function. Further, the speed with which the localization is accomplished is increased by initially defining a portion of the total gamma camera surface in which there is a high probability that the location of the scintillation event of unknown origin lies, and limiting the investigation for the location of the scintillation event of unknown location to that portion of the camera surface, with increasing precision.

SUMMARY OF THE INVENTION

It is an object of the present invention to enable a reliable identification of valid gamma radiation events, in particular gamma radiation events that do not result from pile-up events or inter-crystal Compton scatter, from an analysis of the obtained spatial signal distribution. Further goals are to make the identification more reliable and more robust against failing photodetectors and to obtain reconstructed images with an improved spatial resolution.

It is further an object of the present invention to enable in-situ calibration of photodetector arrays in gamma cameras, respectively in nuclear imaging systems with differences in the gain values of the photosensitive elements in the array.

According to a first aspect of the present invention there is provided an evaluation apparatus for evaluating gamma radiation events detected by a gamma camera and identifying valid gamma radiation events, said gamma camera including a scintillator for emitting scintillation photons at photo conversion positions in the scintillator in response to incident gamma rays and resulting gamma radiation events and a position-sensitive photodetector for detecting emitted scintillation photons and obtaining therefrom a spatial signal distribution. The evaluation apparatus comprises a comparator for comparing an obtained spatial signal distribution with predetermined model distributions for different possible photo conversion positions in the scintillator and for determining therefrom the likelihood function for said different possible photo conversion positions. The evaluation apparatus further comprises a selector for selecting the most likely photo conversion position based on the maximum value of said likelihood function for said different possible photo conversion positions and for determining whether said maximum value of the likelihood function fulfills a predetermined selection criterion indicating whether the evaluated gamma radiation event is a valid gamma radiation event, said predetermined selection criterion being a comparison with a threshold value that is defined as a quantile of a distribution of maximum likelihood values of different valid gamma radiation events in a calibration data set.

Thus, the most likely photo conversion position in the scintillator is determined. The determination of the likelihood function (i.e. the determination of the likelihood values for the different possible photo conversion position) can, e.g., be based on maximum likelihood estimation or least square estimation. In order to obtain a spatial signal distribution, i.e. a distribution of the visible light photos generated in the scintillator, either an analog photodetector may be used and charge pulses may be digitized by means of an analog-digital converter, or a digital photodetector may be used to directly obtain a digital signal. The obtained spatial signal distribution is compared with predetermined model distributions, referring to resulting spatial signal distributions of valid gamma radiation events that are used as a reference. From this comparison, the most likely corresponding photo conversion position and gamma radiation event (in particular from a single gamma ray impact) causing this obtained spatial signal distribution is determined. Then, the function value of the likelihood function, i.e. the maximum likelihood value, is further used for determining whether this current gamma radiation event is sufficiently likely to be interpreted as a valid gamma radiation event. The photo conversion position in the scintillator and the determined validity-indicator are returned.

Particularly, a valid gamma radiation event results from a single gamma ray impact and a single photo conversion position. Other gamma radiation events can, e.g., result from pile-up events or inter-crystal Compton scatter events where it may not be possible to clearly identify the original photo conversion position from the incident gamma ray or where multiple original photo conversion positions exist (e.g. due to multiple simultaneous impacts or scatter). Gamma radiation events can result at least from incident gamma rays, pile-up events and inter-crystal Compton scatter events. All different types of gamma radiation events lead to a spatial signal distribution, which is obtained by the photodetector. However, the determined photo conversion position in the scintillator, which is the basis for the determination of a line of response and for the image reconstruction in nuclear imaging devices, can lead to unclear or incorrect results if the same processing is applied for pile-up events and inter-crystal Compton scatter events. One approach can be the evaluation of the spatial signal distribution or other parameters for determining whether the current gamma radiation event is valid, i.e. results directly from a single incident gamma ray from the decay process that is to be measured/imaged or invalid, i.e., results from a pile-up event or an inter-crystal Compton scatter event. According to the present invention, the evaluation of the detected spatial signal distributions based on the value of the likelihood function is used to differentiate valid and invalid gamma radiation events. Invalid gamma radiation events thereby especially include but are not necessarily limited to gamma radiation events resulting from pile-up events and inter-crystal Compton scatter events. Valid gamma radiation events thereby especially include but are not necessarily limited to gamma radiation events resulting directly from single gamma ray impacts.

One possibility for the predetermined selection criterion that is used in the selector is to make use of a comparison with a threshold value. This threshold value can, e.g., be determined prior to the use of the evaluation apparatus. One possible threshold may be determined based on the number of detected events, i.e. the number of gamma radiation events caused by the nuclear decay processes in a subject (e.g. a patient, a material probe, etc.) being observed with the gamma camera. Another possibility is to determine the threshold based on the intensity of the observed decay process (i.e. the used isotope). The choice of a higher threshold leads to a lower percentage of events classified as valid with reference to all detected events. If a lower threshold is selected, a higher number of events are classified as valid. Additionally, other criteria, e.g. criteria based on the signal distribution like shape analysis, spot size, standard deviation or combinations, may also be considered.

If, e.g., due to a higher intensity of the observed nuclear decay process or a longer observation time, the number of detected events is high, the choice of a higher threshold might result in a good discrimination of undesired pile-up and inter-crystal Compton scatter events. On the other hand, a higher percentage of events might be rejected that could have been used. If the total number of detected events is low then it might not be possible to reject a high percentage of the events because too few positions in the scintillator used in the estimation of lines of response might result in worse images.

According to another embodiment of the present invention this threshold value is defined as a quantile of the distribution of the maximum likelihood values of different valid gamma radiation events in a calibration data set. The calibration data set can be obtained from an experimental study, wherein a number of different subjects and/or calibration phantoms are examined. Alternatively, the calibration data set can be obtained from Monte Carlo simulations, wherein a number of different subjects and/or calibration phantoms are simulated. Further alternatively, this calibration data set can be obtained from analytical modeling, wherein at least one subject and/or calibration phantom is modeled.

This means that the spatial signal distributions resulting from single gamma ray impacts and the corresponding maximum likelihood values are used to establish a reference distribution from which the threshold value is derived. By selecting a quantile of the distribution of the maximum likelihood values of different valid gamma radiation events, the percentage of events that are classified as invalid can directly be defined. If, e.g., the 75% quantile is chosen, then, given that the calibration data set used to determine the distribution of the maximum likelihood values is adequate, it can be assured that those 25% of the events which have the lowest similarity to valid gamma radiation events are rejected. Again, the percentage can be adjusted depending on the total number of detected events as explained above.

According to yet another embodiment of the present invention the predetermined model distributions are obtained from an experimental calibration procedure, Monte Carlo simulations, and/or analytical modeling. In order to determine the likelihood function for different possible photo conversion positions resulting from valid gamma radiation events the resulting spatial signal distributions as obtained by the position-sensitive photodetector are compared to reference or model distributions of possible valid gamma radiation events. This means that for each valid gamma radiation event the corresponding spatial signal distribution is determined by means of experimental calibration, simulation or modeling and used as a model distribution, i.e., a predetermined model distribution. This predetermined model distribution serves as a basis for the comparison. Ideally, a detected valid gamma radiation event results in the very same spatial signal distribution for the same photo conversion position in the scintillator. However, deviations occur due to slight variations of the photo conversion positions in the scintillator or effects in the real measurement like scatter or noise or others.

Depending on the set-up it can be too difficult or too expensive to obtain the predetermined model distribution from an experimental calibration procedure. If this is the case an alternative way is to make use of Monte Carlo simulations or analytical modeling. Monte Carlo simulations refer to repeated random sampling in order to obtain a model of the underlying distribution. If a statistical model is available with known dependencies and distributions, then Monte Carlo simulations can be used to determine a resulting distribution even if an analytical model would be too difficult to calculate. Analytical modeling refers to using a model and to determining the resulting distributions based on calculations based on said model. Both, Monte Carlo simulations and analytical modeling are especially useful if it is not possible to carry out an experimental calibration procedure.

Another essential aspect for obtaining reasonable results from a position-sensitive photodetector including the use in an evaluation apparatus as defined above is the calibration of the photodetector. Light-sharing usually renders in-situ calibration by locating the full absorption peak of the gamma rays energy spectrum impossible and dismounting the arrays for gain calibration is usually not feasible for commercial products, since it generally has to be repeated periodically.

According to one aspect of the present invention there is thus provided a calibration apparatus for in-situ calibrating a position-sensitive photodetector of a gamma camera for the detection of gamma radiation events. This gamma camera includes a scintillator for emitting scintillation photons at photo conversion positions in the scintillator in response to incident gamma rays from a calibration phantom resulting from gamma radiation events and a position-sensitive photodetector comprising an array of photosensitive elements for detecting emitted scintillation photons and obtaining therefrom a spatial signal distribution. The calibration apparatus comprises a histogram module for determining a histogram of the energy spectrum of at least one photosensitive element resulting from a number of detected gamma radiation events. The calibration apparatus further comprises a background value module for determining a background value for at least one photosensitive element based on said histogram. Still further, the calibration apparatus comprises a calibration value module for determining a gain calibration value for at least one photosensitive element from said histogram, a predetermined calibration value and said background value.

Thus, a calibration apparatus is proposed which allows determining a gain calibration value for each photosensitive element in a photodetector array, in particular for a photodetector array coupled to a scintillator in light-sharing configuration. In such arrays the gain values of the different pixels usually differ from each other which may be a result from tolerances in the fabrication of the pixels or other effects.

By determining a gain calibration value, different gains of the single photosensitive element of the photodetector array can be compensated. If no calibration is applied, the obtained spatial signal distributions might be difficult to interpret. Particularly if light-sharing is used, these gain differences lead to results that are difficult to interpret and/or to an erroneous position determination. For single photosensitive elements coupled to a scintillator in one-to-one coupling it is possible to calibrate each photosensitive element by flooding the detector and obtaining characteristic points in the energy spectrum captured with the single pixel that can be used as calibration points. However, in light-sharing coupling the resulting energy spectrum for each single pixel is a product of different inputs and no characteristic points to use for calibration can be distinguished. Thus, it may be useful to use a calibration apparatus as defined above which does not rely on the evaluation of characteristic points in the energy spectrum resulting from deterministic photon input. Prior to using an evaluation apparatus as defined above, the calibration of the photodetector by means of a calibration apparatus as proposed above may be useful. Particularly the in-situ calibration, i.e. the calibration while the photodetector is mounted to the scintillator, allows efficiently calibrating the photodetector by means of calibration. Other calibration approaches may be less efficient in that they require a disassembly of the photodetector and the scintillator or may not provide sufficiently accurate results.

Further, the gain of semiconductor photodetectors may depend on the temperature, which can vary from one day to another resulting in gain differences over time. Temperature of the sensors is hardly decoupled from ambient temperature, therefore temperature differences of a few degrees centigrade from one examination day to another can be easily observed. Thus also gain may vary from one day to another. Therefore using acquired examination data for auto gain calibration is a useful measure to correct for that.

According to one embodiment of the calibration apparatus, the histogram module is configured for determining an inverse, logarithmic and normalized histogram of the energy spectrum of at least one photosensitive element resulting from a number of detected gamma radiation events and/or wherein said background value module is configured for determining a background value for at least one photosensitive element based on the maximum of the derivation of said histogram.

According to another embodiment, the calibration value module is configured for determining a gain calibration value for at least one photosensitive element from the intersection point at which said histogram falls below a limit value calculated as the sum of a predetermined calibration value and said background value.

According to another aspect of the present invention there is provided a nuclear imaging device comprising a gamma camera including a scintillator for emitting scintillation photons at photo conversion positions in the scintillator in response to incident gamma rays and resulting gamma radiation events and a position-sensitive photodetector for detecting emitted scintillation photons and obtaining therefrom a spatial signal distribution. This nuclear imaging device further comprises an evaluation apparatus as defined above and a calibration apparatus as defined above.

Nuclear imaging devices particularly include Positron Emission Tomography (PET) devices and Single Photon Emission Computed Tomography (SPECT) devices being often used in medical tomographic imaging. Gamma rays are emitted by a radioactive substance being delivered into a patient (a subject), e.g. through injection into the bloodstream or through oral intake. These gamma rays are captured by means of a gamma camera, and images can be generated based on the reconstruction of so-called lines of response. Lines of response are straight lines between two coinstantaneous gamma ray impacts at opposite positions on each side of the subject. As outlined above, the used gamma camera usually comprises a scintillator and a photodetector.

One specific embodiment of this nuclear imaging device according to the present invention is a nuclear imaging device wherein the scintillator comprises a monolithic scintillation crystal or an array of scintillation crystals, in particular a Lutetium-Yttrium Orthosilicate (LYSO) crystal array. Both types of scintillators, monolithic scintillation crystals or scintillation crystal arrays, allow the application of the evaluation apparatus and/or the application of the calibration apparatus as defined above.

According to a further embodiment of the nuclear imaging device, the position-sensitive photodetector comprises an array of photosensitive elements, in particular a Silicon photomultiplier (SIPM) array. Such arrays of photosensitive elements are particularly prone to pile-up events and intercrystal Compton scatter events, which usually result in a reduction of the image quality. A possible countermeasure is the use of a higher dose of the radioactive isotope in the subject and the filtering of the detected gamma radiation events, e.g. with an evaluation apparatus as defined above.

Still another embodiment of the nuclear imaging device comprises a scintillator and a position-sensitive photodetector that are mounted in light-sharing configuration with a light-guide interposed in between the scintillator and the photosensitive photodetector. The evaluation apparatus according to the present invention is particularly useful if the photodetector and the scintillator are mounted in light-sharing configuration. Light-sharing configuration means that the scintillation photons emitted by the scintillator are detected by multiple elements of the photodetector so that a high number of pile-up events may occur.

According to further aspects of the present invention, there are provided a method for evaluating gamma radiation events detected by a gamma camera and identifying valid gamma radiation events, a method for in-situ calibrating a position-sensitive photodetector and a method for nuclear imaging.

The methods may particularly make use of an evaluation apparatus, a calibration apparatus or a nuclear imaging device as defined above.

In yet further aspects of the present invention, there are provided a computer program which comprises program code means for causing a computer to perform the steps of the methods as outlined above when said computer program is carried out on a computer as well as a non-transitory computer-readable recording medium that stores therein a computer program product, which, when executed by a processor, causes the methods disclosed herein to be performed.

Preferred embodiments of the invention are defined in the dependent claims. It shall be understood that the claimed methods, computer program and recording medium have similar and/or identical preferred embodiments as the claimed apparatus and as defined in the dependent claims.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1A:
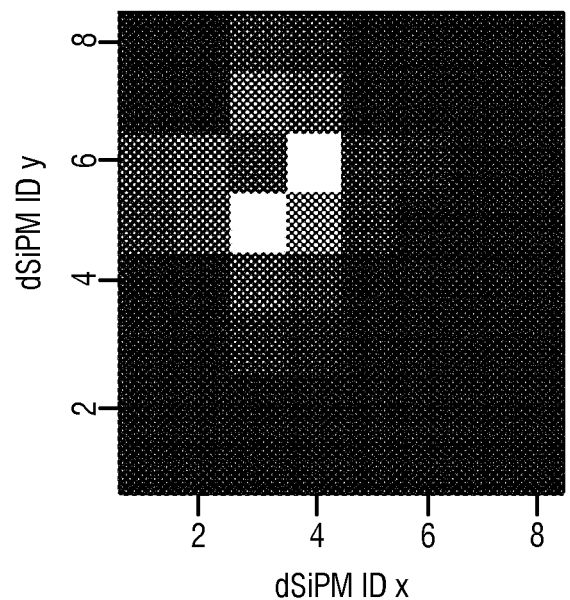
FIG. 1 shows a diagram illustrating two obtained spatial signal distributions of a 8×8 photodetector array resulting from a single gamma ray impact (FIG. 1a) and from a pile-up event (FIG. 1b)

The detection of gamma radiation events resulting from nuclear decay process is often used to reconstruct images, e.g. for medical purposes. For this detection the gamma camera generally comprises a scintillator where incident gamma rays are converted to scintillation photons and a position-sensitive photodetector e.g. a position-sensitive photomultiplier (PSPMT), an array of photomultiplier, arrays of avalanche photodiodes (APDs) or position-sensitive APDs or arrays of silicon photomultipliers (SiPMs, also digital SiPMs, dSiPMs). Generally, a position-sensitive photodetector allows determining a position of incident photons. Incident photons are converted to a spatial signal distribution or charge pattern which can then be evaluated in order to locate the position of the incident photon. In the present application the scintillation position, i.e. the photo conversion position in the scintillator, is usually determined from the emitted scintillation photons. These scintillation photons are captured with the position-sensitive photodetector. Then, the position in the scintillator is determined based on the obtained spatial signal distribution. Based on this position, the lines of response (LOR) are reconstructed which are then the basis for the image reconstruction.

In one-to-one coupling configuration, each scintillator element is coupled to a single photodetector. The determination of the photo conversion position in the scintillator can then be directly based on the corresponding photodetector, in particular the corresponding photosensitive element of the photodetector array. This, however, requires a large number of digitization channels (one for each scintillation element of the scintillator). An alternative is the use of light-sharing coupling where a photo conversion in one scintillation element of the scintillator is recorded by different photodetectors or elements in a photodetector array. Usually, a light-guide is interposed in between the scintillator and the photodetector. In this way, the scintillation light from a single photo conversion is distributed over several photodetectors and the number of required digitization channels is reduced considerably. The readout from the photodetector is then a spatial signal distribution or charge pattern.

After digitization of this spatial signal distribution, the position of the photo conversion (i.e. the scintillation) and the energy of the impact can be computed. The most widely used method is centroid computation (also called Anger method or Centre of Gravity (CoG)). Alternatively, maximum likelihood estimation can be used. For this alternative method the likelihood for every scintillation crystal i is computed from the digitized charges $q=\{q_j\}$ that were observed at photodetector j:

$$\mathcal{L}_i(i, E \mid q) = \sum_j q_j \log[c_{i,j} E] - c_{i,j} E,$$

where E is the energy of the incident gamma ray and $c_{i,j}$ refers to the elements of the spatial signal distribution matrix that gives the expected charge for every crystal i and every photodetector j. The crystal index i for which the computed likelihood value is the highest, is the one where the scintillation took place most likely:

$$i^{(n)} = \mathrm{argmax}_i \mathcal{L}_i(i, E^{(n)} \mid q),$$

With the knowledge of $i^{(ML)}$ and the matrix element $c_{i,j}$, the energy of the gamma ray event can be predicted:

$$E^{(n+1)} = \frac{\sum_j q_j}{\sum_j c_{i(n),j}}.$$

However, occurring gamma radiation events are not limited to single gamma ray impacts at photo conversion positions. Also, pile-up events, inter-crystal Compton scatter and other inter-crystal scatter events occur and can lead to ambiguous spatial signal distributions.

Figure 1B:
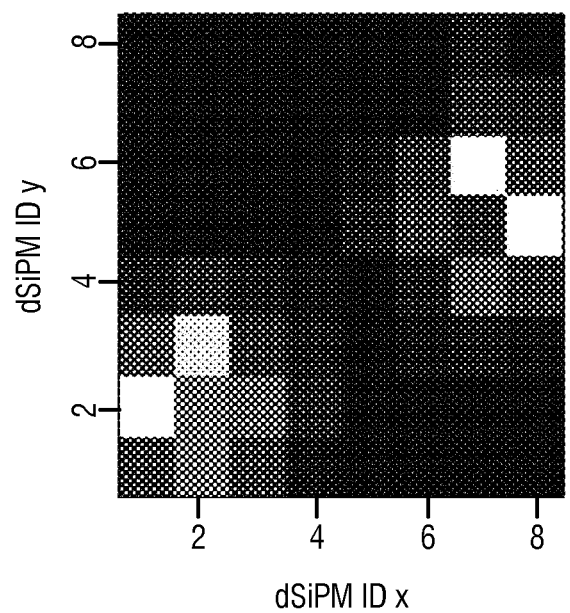

FIG. 1 shows illustrations of two typical spatial signal distributions registered by a photodetector in a gamma camera, comprising a 30×30 LYSO pixel array representing the scintillator coupled to an 8×8 digital SiPM (dSiPM) array representing the photodetector. FIG. 1a shows a spatial signal distribution from a gamma radiation event resulting from a single gamma ray impact. FIG. 1b shows a spatial signal distribution for a gamma radiation event resulting from a pile-up event. CoG positioning and ML based positioning work fine, as long as there are only gamma radiation events resulting from single gamma ray impacts. If more than one gamma ray impact occurs at the same time (pile-up event), the detected spatial signal distribution has more than one maximum as shown in FIG. 1b and the gamma ray events are wrongly positioned when using CoG or ML positioning alone.

Figure 2A:
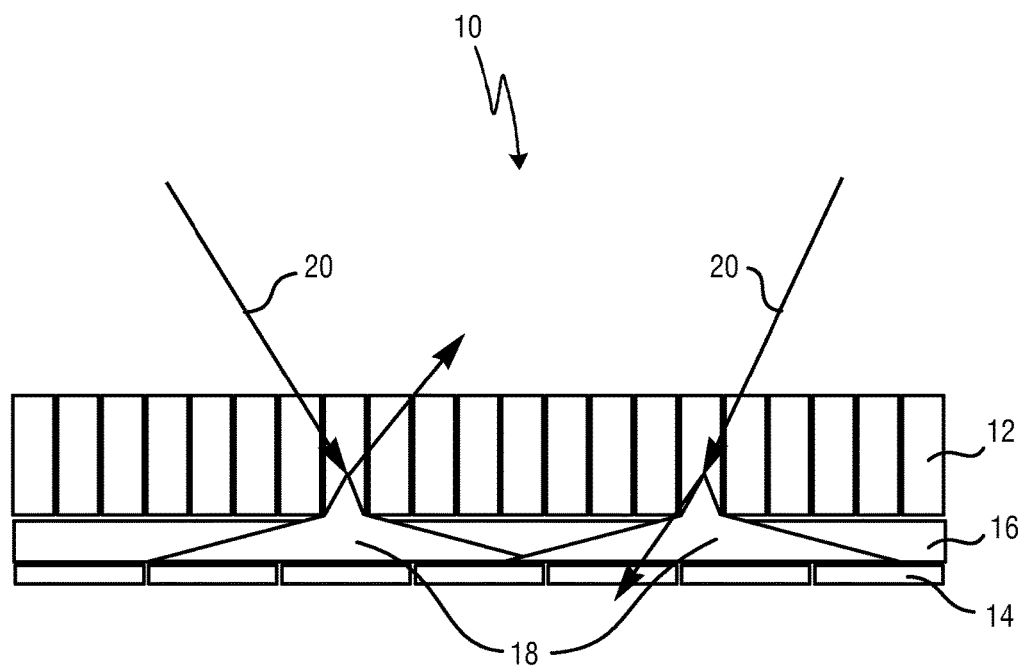
FIG. 2 illustrates pile-up events (FIG. 2a) and inter-crystal Compton scatter events (FIG. 2b) by means of a section view of the scintillator, the light-guide and the position-sensitive photodetector comprised in a gamma camera.

FIG. 2a shows a cross-sectional view of an embodiment of a gamma camera 10, i.e. a scintillation detector. The gamma camera 10 comprises a scintillator 12, a photodetector 14 and a light-guide 16 in between. There is visualized the spatial signal distribution of a gamma radiation event resulting from a pile-up event 18, which is caused by two coinstantaneous but independent gamma rays 20. The independent gamma rays 20 impact at the same time. If both interact via photo effect, such events can be discriminated by means of an energy filter, but if they interact via Compton effect and the secondary gamma ray escapes from the scintillator, the sum of their energy deposits may lay inside the energy window around 511 keV. Thus, it might not be possible to detect such events by means of an energy filter and wrong positions will be computed with the CoG or ML method.

Figure 2B:
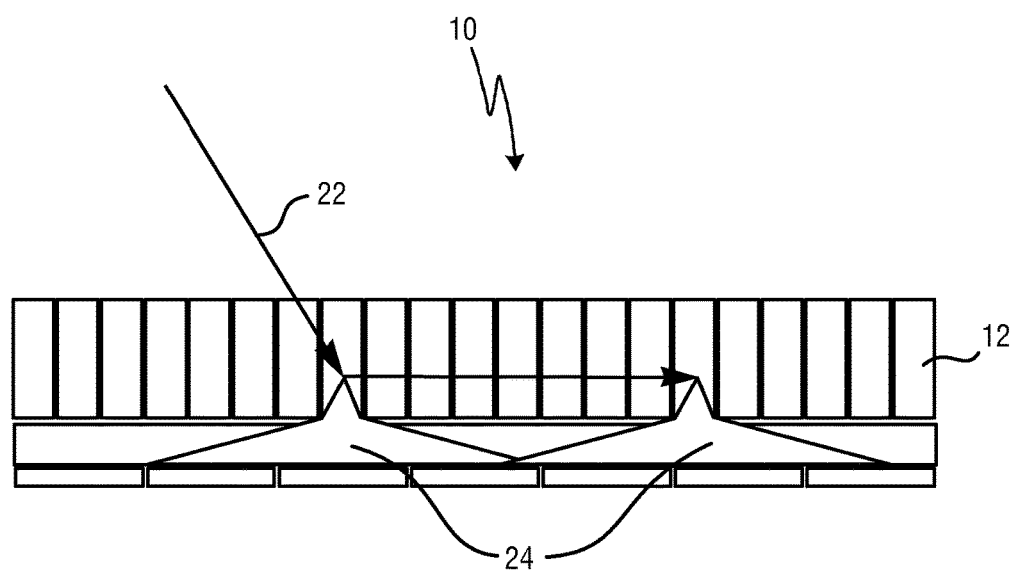

Apart from pile-up events and resulting gamma radiation events, another source for an ambiguous spatial signal distribution can be inter-crystal Compton scatter. FIG. 2b shows an inter-crystal Compton scatter event. An incident gamma ray 22 first interacts with the scintillator 12 in the gamma camera 10 via Compton Effect. Then, the deflected gamma ray travels through the scintillator 12 and interacts via photo effect. The distance between both interactions can be several pixels. The obtained spatial signal distribution on the photodetector 24 of the gamma radiation event resulting from an inter-crystal Compton scatter event again does not allow accurately determining the position of the incident gamma ray 22. Especially for high resolution systems this effect occurs frequently and may lead to a substantial number of position errors.

Figure 3:
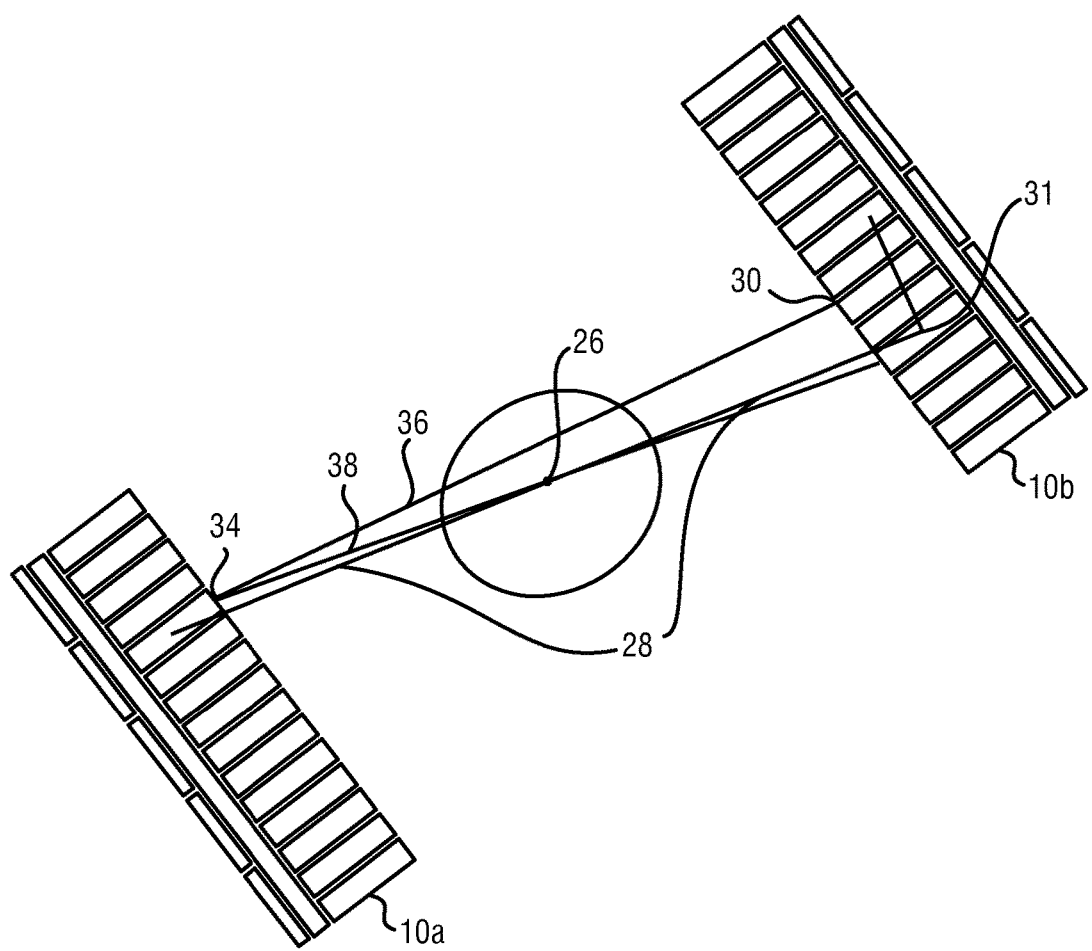
FIG. 3 illustrates the problems resulting from lines of response constructed on the basis of inaccurately determined photo conversion positions.

The fraction of all gamma radiation events representing pile-up events or inter-crystal Compton scatter events strongly depends on the activity inside the gamma camera's 10 field of view (FOV), the used radioactive isotope and the geometry of the scintillator, photodetector, and gantry. Both PET and SPECT imaging are affected by this problem. FIG. 3 illustrates the consequences of erroneously determined photo conversion positions 30 for PET image reconstruction. The β+ decay 26 generates two gamma photons that fly away in opposite directions 28 and that are detected by means of two gamma cameras 10a, 10b. One photon is scattered 31 resulting in a spatial signal distribution that again results in an erroneously determined photo conversion position 30 in the scintillator. As a consequence, even if the photo conversion position in the scintillator on the other side 34 is determined correctly, an erroneous line of response 36 is determined in contrast to the correct LOR 38. Thus, in the final reconstructed image, gamma radiation events resulting from pile-up events and inter-crystal Compton scatter result in a degradation of the spatial resolution and in a decrease of the signal-to-noise ratio because erroneous lines of response 36 will be used during image reconstruction.

Figure 4:
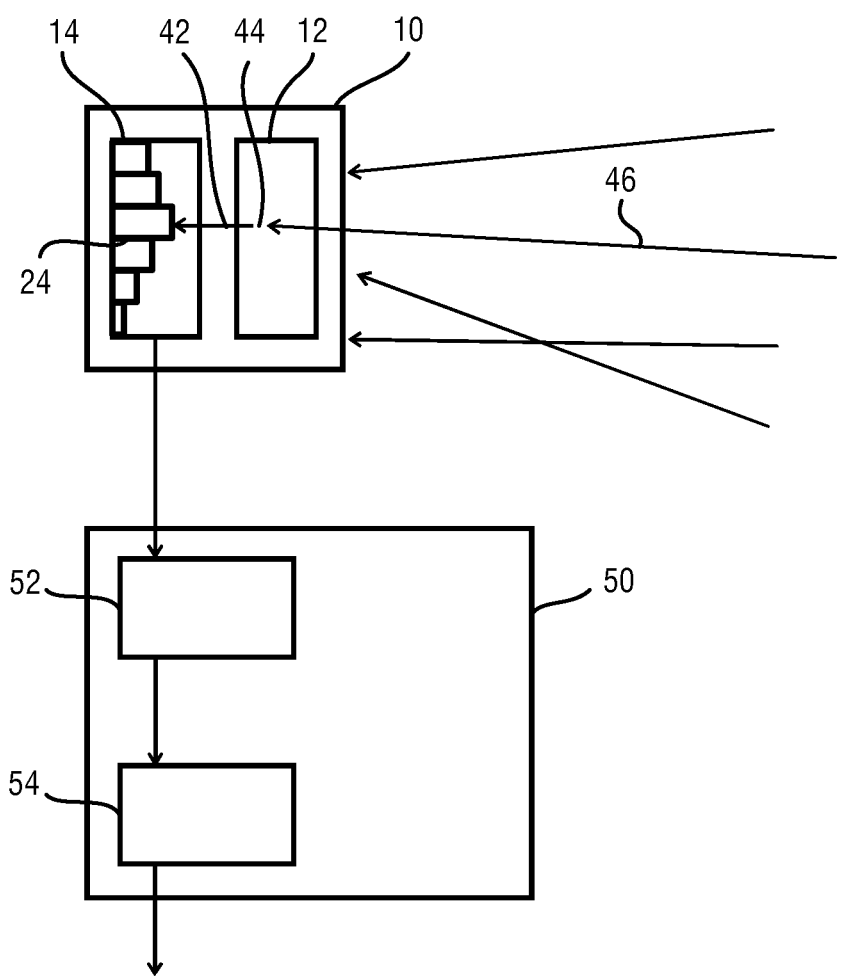
FIG. 4 shows a diagram of an embodiment of an evaluation apparatus according to the present invention and a gamma camera.

FIG. 4 shows an embodiment of an evaluation apparatus 50 according to the present invention. Gamma radiation events are detected by a gamma camera 10 comprising a scintillator 12 and a photodetector 14. These gamma radiation events result from all events that cause the scintillator 12 to emit scintillation photons 42 at photo conversion positions 44 in the scintillator 12. In the example as illustrated in FIG. 4, the impact of a single gamma ray 46 at a single photo conversion position 44 results in a gamma radiation event. In nuclear imaging, it is the goal to correctly determine the position of the impact 44 of the gamma ray 46, i.e. the photo conversion position 44 of a single gamma ray. Based on two coinstantaneous impacts and photo conversion positions from a single gamma ray impacts detected with gammas camera on both sides of a subject, a line of response can be determined. Based on a plurality of such lines of response, an image can be reconstructed. However, apart from impacts of single gamma rays (valid gamma radiation events), other possible gamma radiation events can also result from pile-up events, inter-crystal Compton scatter events and others (invalid gamma radiation events). In this context, invalid gamma radiation events refer to events that lead to ambiguous spatial signal distributions and to errors when reconstructing an image from the determined lines of response. A valid gamma radiation event results particularly from a single gamma ray impact.

As shown in FIG. 4 the obtained spatial signal distribution 24 of the gamma radiation event is evaluated in an evaluation apparatus 50. This evaluation apparatus 50 comprises a comparator 52 for comparing the obtained spatial signal distribution 24 with predetermined model distributions for different possible photo conversion positions in the scintillator 12 and for determining therefrom the likelihood function for said different possible photo conversion positions. Further, the evaluation apparatus 50 comprises a selector 54 for selecting the most likely photo conversion position based on the maximum value of said likelihood function for said different possible photo conversion positions and for determining whether said maximum value of the likelihood function fulfills a predetermined selection criterion indicating whether the evaluated gamma radiation event is a valid gamma radiation event.

The invention is based on the insight that the likelihood value of the spatial signal distribution is very well suited to identify pile-up events and inter-crystal Compton scatter events. The approach is particularly designed for gamma cameras or scintillation detectors comprising a scintillator including an array of small scintillation crystals or a single monolithic scintillator, a photodetector including an array of photosensitive elements or a position-sensitive photodetector and a readout electronics that is able to read out all photosensitive elements at the same time in order to obtain the spatial signal distribution of a gamma radiation event. Models for the spatial signal distributions to which the measured charge pattern or spatial signal distribution is to be compared, i.e. predetermined model distributions, can be obtained from measurements, i.e. an experimental calibration procedure, Monte Carlo simulations, i.e. discrete simulations of the events in order to determine a distribution or analytic modeling. In a preferred embodiment a list that contains likelihood values for a typical data set is used for determining a statistical distribution and corresponding quantiles. This list can be obtained from a calibration data set. For each event of this calibration data set, the likelihood value is recorded and stored. The quantiles are determined in order to relate the likelihood values to fractions of events that are to be filtered out. This allows establishing the likelihood threshold for any filter fraction that may be applied.

During normal operation of a nuclear imaging device (e.g. a PET or a SPECT apparatus), the likelihood value of the event is determined and compared to the likelihood threshold. The event is discarded (invalid event), if it is smaller than the threshold value.

The presented apparatus and method can be used with any scintillation detector or gamma camera that comprises a pixelated or monolithic scintillation crystal and a position-sensitive photodetector, e.g. an array of photosensitive elements. If the pitch of the photosensitive elements is a multiple of the pitch of the scintillation crystal elements, then a light-guide is placed in between the scintillator and the position-sensitive photodetector. In case the pitch of the photosensitive elements matches the pitch of the crystal elements, each crystal will be read out by a single photosensitive element of a photodetector array (one-to-one coupling). In this case, pile-up events become unlikely but inter-crystal Compton scatter is still present. The readout electronic may then read out every photosensitive element in a reasonably short time in order to obtain complete spatial signal distributions. From these spatial signal distributions, the likelihood value can be computed as follows:

$$MLE: \mathcal{L}_i(i, E | q) = \frac{1}{M'} \left[ \sum_{j'} (-c_{i,j'}E + q_{j'}\log(c_{i,j'}E) - \log(c_{j'}!)) \right]$$

$$LS: \mathcal{L}_i(i, E | q) = \frac{1}{M'} \left[ \sum_{j'} -\frac{1}{2}\left(\frac{q_{j'} - c_{i,j'}E}{\epsilon_{j'}}\right)^2 - \log(\sqrt{2\pi}\,\epsilon_{j'}) \right]$$

$$n! \approx \sqrt{2\pi n}\left(\frac{n}{e}\right)^n e^{\frac{1}{12n}}$$

$$\Rightarrow \log(q_{j'}!) = \frac{1}{2}\log(2\pi q_{j'}) + q_{j'}\log\left(\frac{q_{j'}}{e}\right) + \frac{1}{12 q_{j'}}$$

where MLE means Maximum likelihood estimation, LS means least square estimation, i is the index of the crystal pixel, j is the index of the photosensitive element of the photodetector element, E is the energy of the gamma radiation event, $q_j$ is the detected charge at photosensitive element (pixel) j, $\epsilon_j$ is the measurement error for $q_j$ and $c_{i,j}$ is the predetermined model distribution for comparison. The matrix elements $c_{i,j}$ may be obtained by measurement and states how much light is expected in photosensitive element j if the photo conversion took place in photosensitive element (pixel) i. Since the logarithm of the factorial presents a problem for numerical computations, it is approximated using the Stirling approximation (last two equations). The maximum likelihood values are computed for each event. From a calibration procedure, threshold values for the maximum likelihood values may be derived. For this, the coincidences of a measured data set can be determined and the likelihood values for each coincident photo conversion position corresponding to a single gamma ray impact can be computed. From the likelihood values of the test data set the quantiles are computed. This allows establishing the likelihood threshold as a function of the total number of recorded events and the desired differentiation. During normal measurements, a reasonable threshold is chosen. For instance 10% of all detected gamma radiation events are filtered out before reconstruction.

Figure 5:
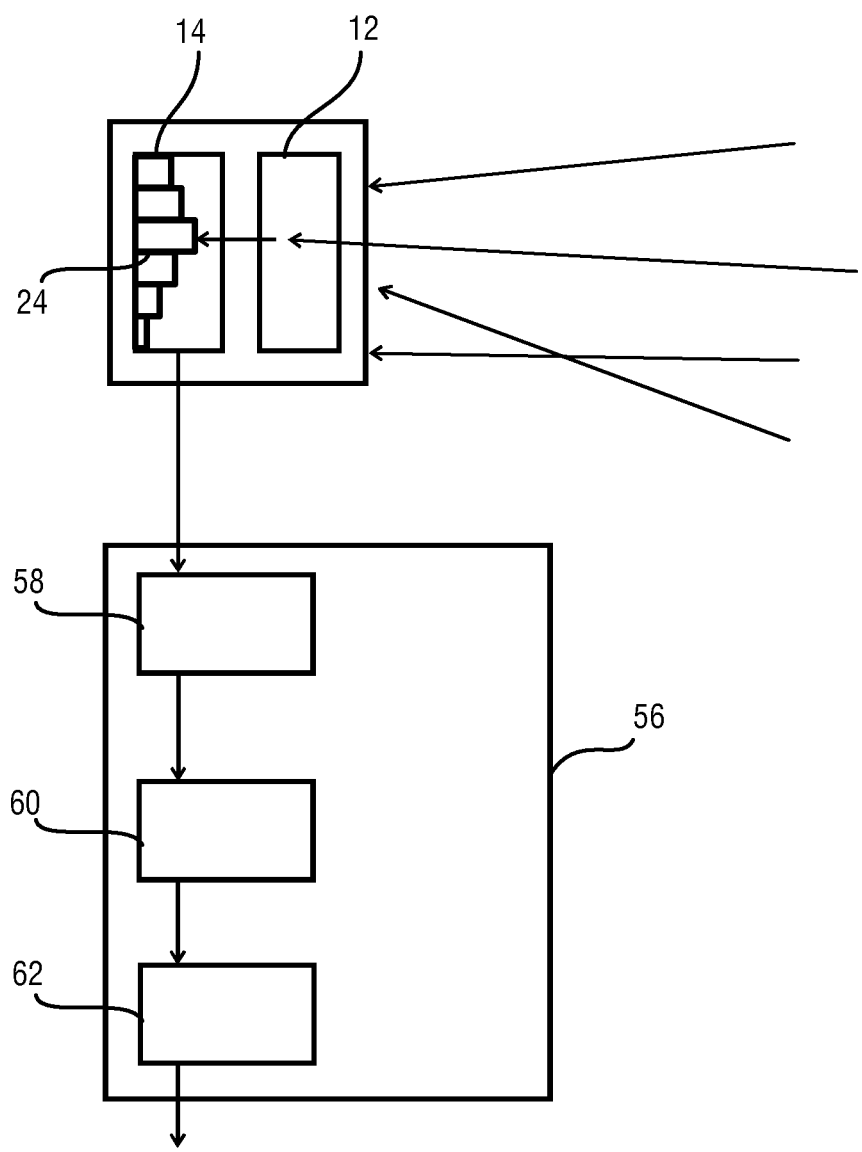
FIG. 5 shows a schematic diagram of an embodiment of a calibration apparatus according to the present invention and a gamma camera.

Another aspect of the present invention is the appropriate calibration of the photodetector which may be used with the present evaluation apparatus or nuclear imaging device. FIG. 5 shows an embodiment of a calibration apparatus 56 according to the present invention. The obtained spatial signal distributions 24 are usually difficult to interpret if the photodetector 14 is not adequately calibrated. The measurement of the scintillation light amount with each photosensitive element of a photodetector array is complicated by the fact that there is a large spread of the gain due to fabrication. For example, gain variations of up to factors of two on a single PSPMT or SiPM array are easily observed. If the gain differences between the photosensitive elements of a photodetector array are known the data processing and image reconstruction may be improved. In the case of one-to-one coupling of scintillator 12 and photodetector 14, it is generally useful for correct system wide energy discrimination. In case of light-sharing, inter-pixel (photodetector pixel, i.e. photosensitive element) gain differences may even be more important since these gain differences introduce important errors in the estimation of the light distribution (i.e. the spatial signal distribution) which is used for the positioning. During calibration, gain differences lead to wrong likelihood values for the use in the evaluation of gamma radiation events. The gain differences of most devices can be measured by irradiating them with a controlled amount of light and measuring the amplitudes of the generated signals. Obviously, this cannot be done in-situ, since the scintillator crystal array generally has to be removed. Another possibility consists in irradiating the mounted detector block with gamma radiation and estimate the gain for each crystal pixel from the position of characteristic peaks in the energy spectra.

The calibration apparatus 56 as shown in FIG. 5 comprises a histogram module 58, a background value module 60 and a calibration value module 62. In the histogram module 58, an inverse, logarithmic and normalized histogram of the energy spectrum of each photosensitive element resulting from a number of gamma radiation events is determined. In the background value module 60, a background value for each photosensitive element is determined based on the maximum of the derivation of said histogram. In the calibration value module 62, a gain calibration value each photosensitive element is determined from the intersection point of the histogram and a vertical line calculated from a predetermined calibration value and the background value.

Figure 6:
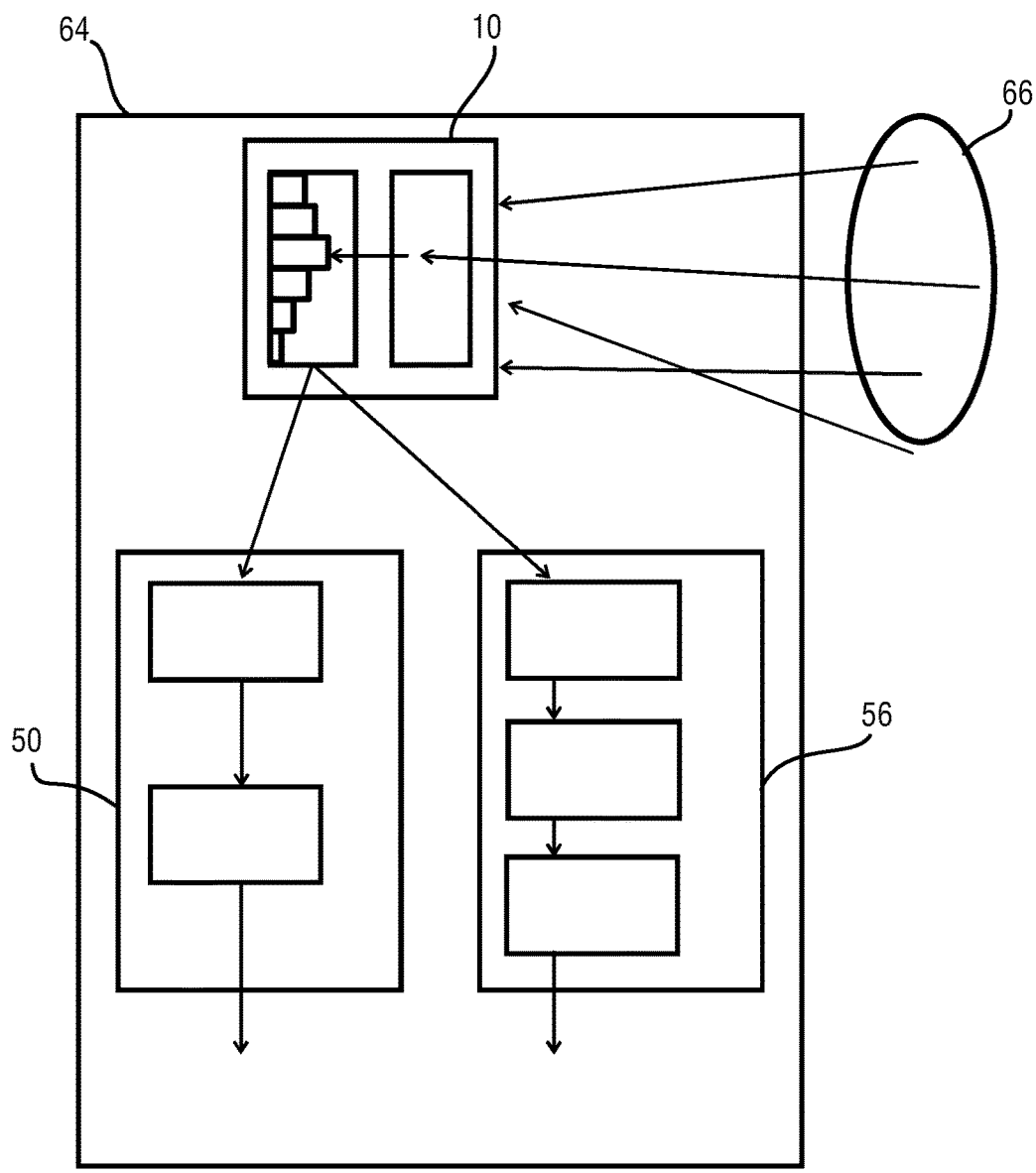
FIG. 6 shows a schematic diagram of an embodiment of a nuclear imaging device according to the present invention.

FIG. 6 shows a schematic diagram of an embodiment of a nuclear imaging apparatus 64 according to the present invention. A nuclear decay process in a subject 66, e.g. a patient or a calibration phantom, is observed with a gamma camera 10 being part of the nuclear imaging apparatus 64. Apart from the gamma camera 10 the nuclear imaging apparatus 64 includes an evaluation apparatus 50 and/or a calibration apparatus 56 as described above.

Figure 7:
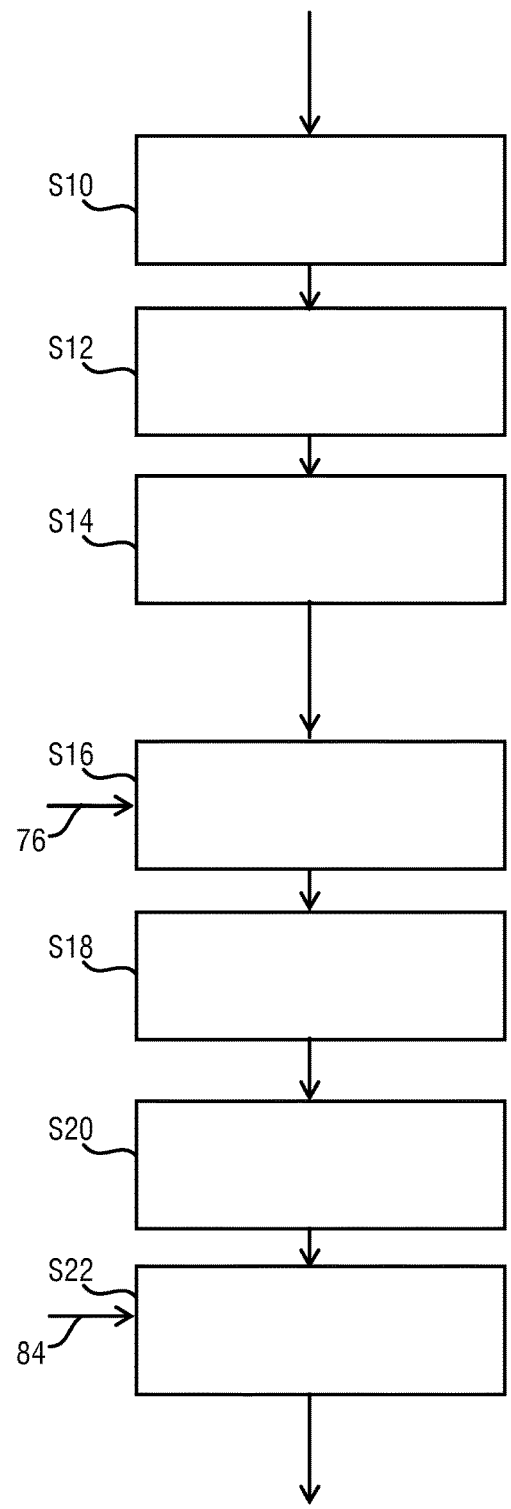
FIG. 7 shows a diagram illustrating a method for evaluating gamma radiation events according to the present invention.

FIG. 7 shows a diagram illustrating a method for evaluating gamma radiation events represented by an obtained spatial signal distribution according to the present invention. Incident gamma rays induce the emission of scintillation photons S10 in the scintillator. These scintillation photons are detected S12 in a photodetector and a spatial signal distribution is obtained S14. In order to determine whether the evaluated gamma radiation event, respectively the obtained spatial signal distribution is a valid gamma radiation event, i.e. corresponds to a single gamma ray impact, the obtained spatial signal distribution is compared S16 to predetermined model distributions 76. Based on this comparison, the likelihood of the obtained spatial signal distribution for a given possible photo conversion position corresponding to a single gamma ray impact is determined S18, i.e. the likelihood function is calculated. Then, the most likely position is selected S20 and it is checked S22 whether the value fulfils a predetermined selection criterion 84. In the present embodiment this predetermined selection criteria 84 is a comparison to a threshold value. If the determined maximum likelihood value is above the threshold the evaluated gamma radiation event is valid, if not it is invalid.

One advantage of the present invention may thus be the provision of reliable identification of gamma radiation events representing pile-up events and inter-crystal Compton and/or the provision of reliable identification of valid gamma radiation events that allow correctly determining the photo conversion position of the incident single gamma ray. Therefore, the obtained spatial signal distribution is analyzed directly and not a derived parameter such as the centroid or the total energy which makes the identification more reliable and also robust against failing photodetectors. Failing photodetectors can occur due to aging or due to dead time. In the first case, one or more photosensitive elements of a photodetector array stop working. The charge that corresponds to the position of the failing element then misses in the obtained spatial signal distribution, leading to incomplete data and erroneous centroid computation. However, MLE based positioning is robust against missing data and so is the identification of pile-up event based on Likelihood computation. A second reason for failing photodetectors is their dead time. The corresponding photosensitive element of the photodetector may still be busy handling the charge from a previous event giving also rise to incomplete data but only for this event. Consequences for CoG positioning and MLE positioning are the same as in the case of aging.

Further, the present invention may have the advantage to provide an adjustable threshold for the rejection of pile-up events and inter-crystal Compton scatter events. This allows to adapt the filtering to the amount of data that is acquired and also to the isotope that is used (e.g. $^{22}$Na has an additional 1275 keV gamma photon that is emitted simultaneously and leads to additional pile-up events).

Still further, the present invention may allow an improvement of the spatial resolution of reconstructed images based on data of a gamma camera. Because lines of response that are reconstructed based on gamma radiation events resulting from pile-up events or inter-crystal Compton scatter are filtered out, the data set used for image reconstruction is cleaned from erroneous lines of response. Additionally by removing erroneous lines of response, the signal-to-noise ratio (SNR) of the reconstructed images can be improved.

Still further, the present invention may allow to improve the energy resolution and to create more precise standard uptake values.

Figure 8:
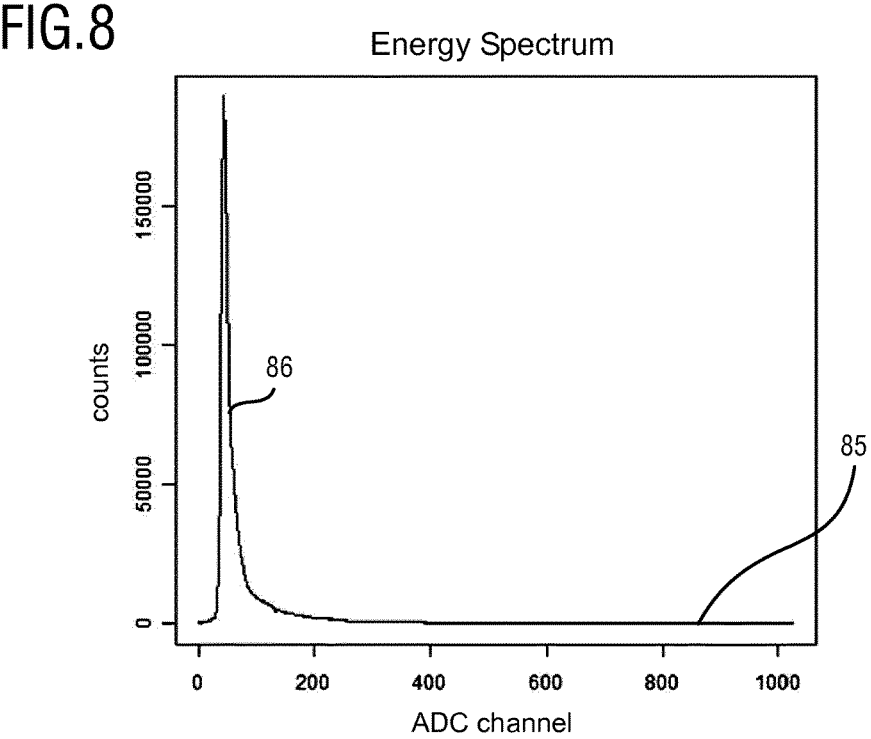
FIG. 8 shows an energy spectrum recorded from a photosensitive element of a photodetector.

In case of gamma cameras that use light-sharing for positioning, in-situ gain calibration using characteristic peaks of energy histograms is not possible because there are no characteristic peaks. FIG. 8 shows an energy spectrum 85 captured from a photosensitive element (i.e. a single pixel) of a SiPM (or dSiPM) array obtained by flooding the detector radiation with 511 keV gamma rays from Fluorodeoxyglucose (FDG). Characteristic points as the 511 keV full absorption peak or the Compton edge cannot be recognized because the light from each crystal is distributed over several pixels. The maximum around channel fifty 86 is caused by the energy threshold for this channel. This maximum cannot be used for gain estimation because it mainly depends on the threshold value. If the sum of all signal values from those SiPMs (i.e. pixels of a SiPM array or SiPM pixels) that are illuminated by the scintillation light pulse, then a full absorption peak could be observed. However due to the light-sharing, several gain values are mixed into one single value. The single SiPM pixel's spectrum is transformed into a form that allows the extraction of a characteristic end point of the energy spectrum (cannot be recognized in FIG. 8). This end point is a good estimator for the relative gain of the SiPM pixel compared to the surrounding SiPM pixels.

The measured energy spectra of each photosensitive element (e.g. SiPM pixel) are mathematically transformed to allow extracting the endpoint of the spectrum. An advantage of the method is that no iterative least square fitting is required. Outcomes of least square fitting depend on the starting parameters and are not guaranteed to converge.

According to one embodiment, the spectrum is transformed by using the following equation in order to obtain an inverse, logarithmic and normalized histogram of the energy spectrum:

$$f(j) = \log\left(\sum_{i}^{N_{ADC\text{-}channels}} h(i) - \sum_{i}^{j} h(i)\right) \Big/ \max\left(\log\left(\sum_{i}^{N_{ADC\text{-}channel}} h(i) - \sum_{i}^{j} h(i)\right)\right)$$

Herein j and i are the energy channels of the histograms f(j) and h(i) and $N_{ADC\text{-}channel}$ is the total number of available energy channels in the histograms. After this processing of the histogram, the endpoint of the energy histogram becomes visible and can be extracted.

Figure 9:
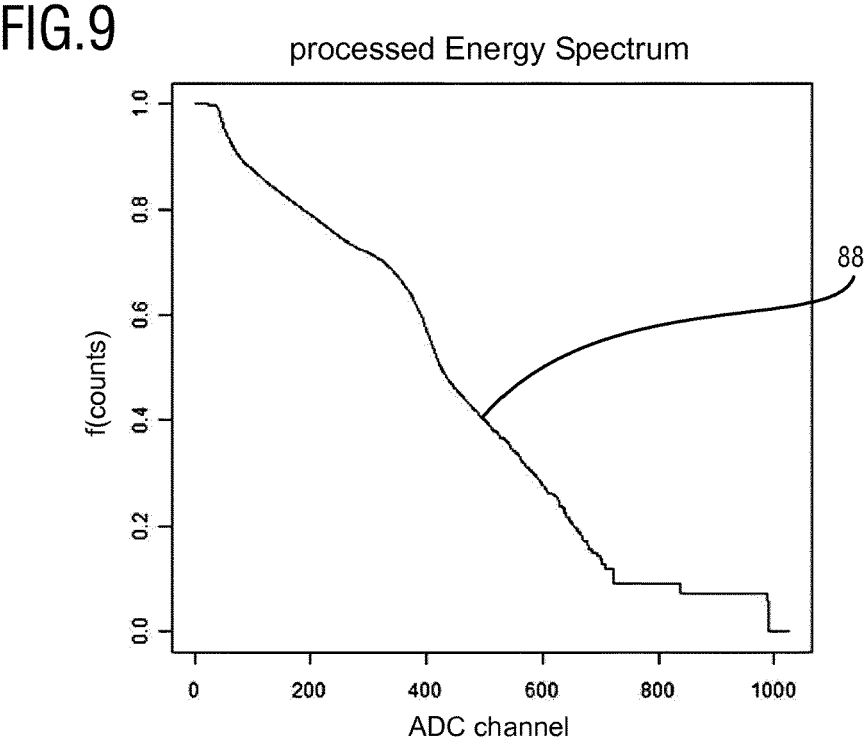
FIG. 9 shows a normalized histogram based on an energy spectrum.

FIG. 9 shows an inverse, logarithmic and normalized histogram 88 of the energy spectrum. This graph is monotonically decreasing and normalized to the range [0,1] on the y-axis. The relative gain of the SiPM pixel can now be extracted by finding the intersection of this graph with a horizontal line at y=y$_0$, where y$_0$ is a free calibration parameter between 0 and 1 that may be predetermined and set by an operator of the system. If this parameter is set to low values (e.g. ~0.1), then the intersection of the line representing this calibration parameter with the modified histogram is in the range of the upper end point of the energy spectrum measured with this SiPM pixel.

Figure 10:
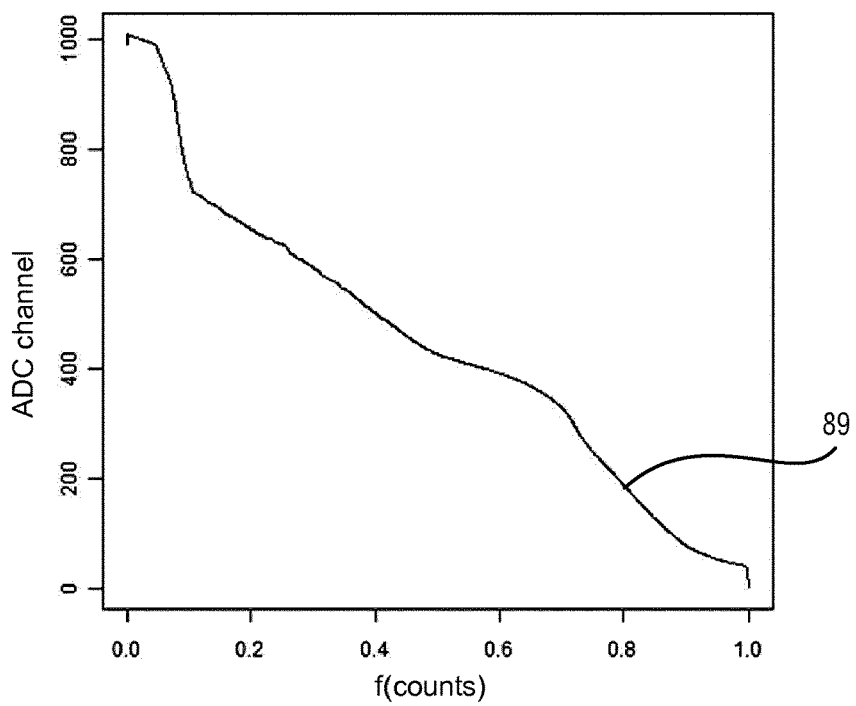
FIG. 10 shows a normalized, inverse and logarithmic histogram based on an energy spectrum.
Figure 11:
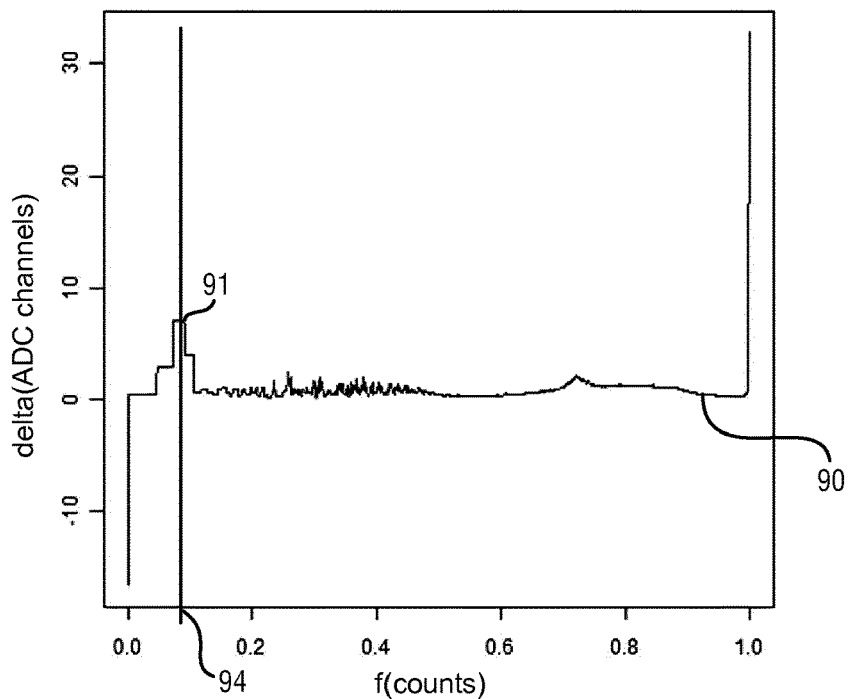
FIG. 11 shows the derivation of a normalized, inverse and logarithmic histogram.

Towards higher channels, usually a background is observed (very few scintillation events from natural background or cosmic radiation). This background may be taken into account, since it may be different for different measurements/SiPMs and can be extracted as follows: First, the inverse function f$^1$ is built. FIG. 10 shows the inverse 89 of the modified energy histogram. Then the derivative 90 of this inverse function is computed as shown in FIG. 11. For lower values of x, a maximum 91 is observed in this new graph. The position of this maximum gives the background value b$_g$ 94 that is then used when calculating the intersection of the horizontal line with the inverse, logarithmic and normalized histogram f(j). The relative gain of the current SiPM pixel may then be determined as the energy channel (x-axis value) at which the histogram falls below the sum of y$_0$ and b$_g$.

Figure 12:
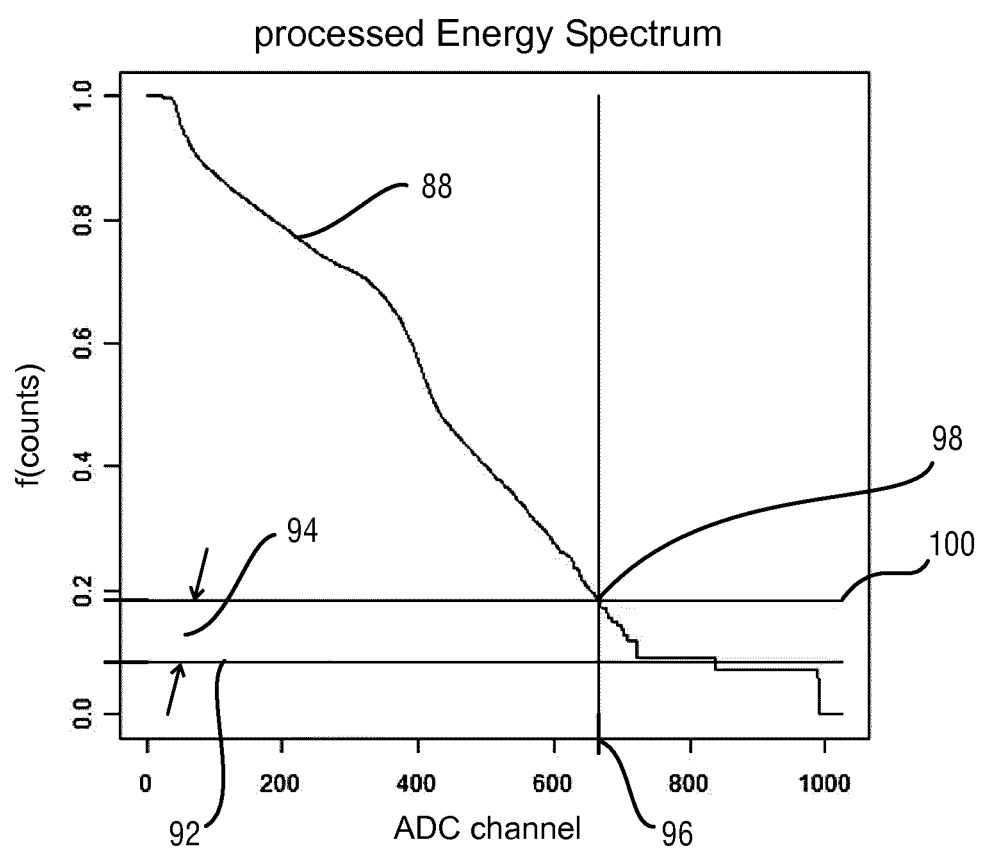
FIG. 12 illustrates the determination of a gain calibration value for a photosensitive element of a photodetector from a normalized, inverse and logarithmic histogram.

FIG. 12 shows the modified histogram 88 (inverse, logarithmic and normalized histogram). In this example, the predetermined calibration value 92 is added to the determined background value 94, which was determined based on the maximum of the derivation of the histogram 91 as described above. Then, the gain calibration value 96 is determined from the intersection point 98 at which the histogram falls below the horizontal line 100 representing the limit value y=y$_0$+b$_g$. In this embodiment, the gain calibration value 96 is then represented by the ADC channel, i.e. the energy value, at which the histogram 88 falls below the limit value 100 (i.e. a threshold) determined from the sum of the background value b$_g$ 94 and the calibration value y$_0$92.

In summary, this outlined method allows fast in-situ calibration of PET block detectors using highly granulated scintillator pixels and light-sharing where no full absorption peak can be observed on a single SiPM.

Figure 13:
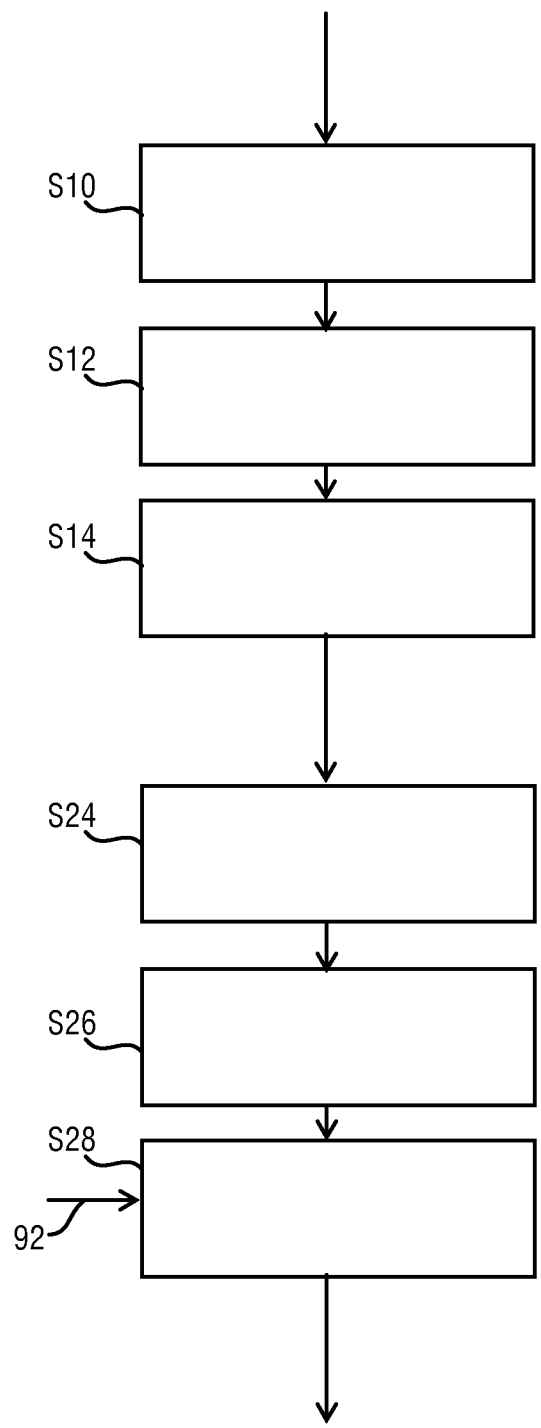
FIG. 13 illustrates a method for in-situ calibrating a position-sensitive photodetector according to the present invention.

FIG. 13 illustrates a calibration method according to the present invention. By means of a gamma camera, different spatial signal distributions are recorded. For this, incident gamma rays, which induce the emission of scintillation photons S10 in the scintillator, are observed. These scintillation photons are detected S12 in a photodetector and a spatial signal distribution is obtained S14. Based on a plurality of recorded spatial signal distributions, an energy spectrum is recorded for each photosensitive element of the photodetector array and—based on this spectrum—an inverse, logarithmic and normalized histogram is determined S24. Then, a background value representing the background or background effect is determined S26 as described above. From the inverse, logarithmic and normalized histogram and the determined background value, finally a gain calibration value is determined S28 taking into account a predetermined calibration value 92.

Further possible embodiments of the invention may also include other apparatus and methods to be used with nuclear imaging devices that are not intended for the use in medical imaging, but for material sciences or other application areas. Additionally, the present invention is not limited to nuclear imaging alone. The herein presented concepts, apparatus and methods might very well be applied to other imaging systems for the use in various application areas, e.g. computed tomography (CT), SPECT/CT, PET/CT, Magnetic Resonance Imaging (MRI), nuclear magnetic resonance imaging (NMRI) or others.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. An evaluation apparatus for evaluating gamma radiation events detected by a gamma camera and discriminating valid gamma radiation events from pile-up events and inter-crystal Compton scatter events, said gamma camera including a scintillator for emitting scintillation photons at photo conversion positions in the scintillator in response to incident gamma rays and resulting gamma radiation events and a position-sensitive photodetector for detecting emitted scintillation photons and obtaining therefrom a spatial signal distribution, the evaluation apparatus comprising:
   a comparator for comparing an obtained spatial signal distribution with predetermined model distributions for different possible photo conversion positions in the scintillator and for determining therefrom the likelihood function for said different possible photo conversion positions; and a selector for selecting the most likely photo conversion position based on the maximum value of said likelihood function for said different possible photo conversion positions and for determining whether said maximum value of the likelihood function fulfils a predetermined selection criterion indicating whether the evaluated gamma radiation event is a valid gamma radiation event, said predetermined selection criterion being a comparison with a threshold value that is defined as a quantile of a distribution of maximum likelihood values of different valid gamma radiation events in a calibration data set and is effective to discriminate between valid gamma radiation events and invalid gamma radiation events comprising pile-up events and inter-crystal Compton scatter events.

2. The evaluation apparatus according to claim 1, wherein the calibration data set is obtained from at least one of:
an experimental calibration study, wherein a number of different subjects and/or calibration phantoms are examined;
Monte Carlo simulations, wherein a number of different subjects and/or calibration phantoms are simulated; and
analytical modeling, wherein at least one subject and/or calibration phantom is modeled.

3. The evaluation apparatus according to claim 1, wherein the predetermined model distributions are obtained from at least one of:
an experimental calibration procedure;
Monte Carlo simulations; and
analytical modeling.

4. The evaluation apparatus according to claim 1, wherein the position-sensitive photodetector comprises an array of photosensitive elements.

5. The evaluation apparatus according to claim 4, wherein the position-sensitive photodetector comprises a SiPM or dSiPM array.

6. A nuclear imaging device comprising:
a gamma camera including a scintillator for emitting scintillation photons at photo conversion positions in the scintillator in response to incident gamma rays and resulting gamma radiation events and a position-sensitive photodetector for detecting emitted scintillation photons and obtaining therefrom a spatial signal distribution wherein said scintillator also emits inter-crystal Compton scatter events; and
an evaluation apparatus for evaluating gamma radiation events detected by the gamma camera and identifying valid gamma radiation events, the evaluation apparatus comprising a computer programmed to:
compare an obtained spatial signal distribution with predetermined model distributions for different possible photo conversion positions in the scintillator and determine therefrom the likelihood function for said different possible photo conversion positions; and
select the most likely photo conversion position based on the maximum value of said likelihood function for said different possible photo conversion positions and determine whether said maximum value of the likelihood function fulfils a predetermined selection criterion indicating whether the evaluated gamma radiation event is a valid gamma radiation event, said predetermined selection criterion being a comparison with a threshold value that is defined as a quantile of a distribution of maximum likelihood values of different valid gamma radiation events in a calibration data set and is effective to discriminate between valid gamma radiation events and invalid gamma radiation events comprising said inter-crystal Compton scatter events.

7. The nuclear imaging device according to claim 6, wherein the scintillator comprises a monolithic scintillation crystal or an array of scintillation crystals.

8. The nuclear imaging device according to claim 7, wherein the scintillator comprises a LYSO crystal array.

9. The nuclear imaging device according to claim 6, wherein the position-sensitive photodetector comprises an array of photosensitive elements.

10. The nuclear imaging device according to claim 9, wherein the position-sensitive photodetector comprises a SiPM or dSiPM array.

11. The nuclear imaging device according to claim 6, wherein the scintillator and the position-sensitive photodetector are mounted in light-sharing configuration with a light-guide interposed in between the scintillator and the position-sensitive photodetector.

12. The nuclear imaging device according to claim 6, wherein the calibration data set is obtained from at least one of:
an experimental calibration study, wherein a number of different subjects and/or calibration phantoms are examined;
Monte Carlo simulations, wherein a number of different subjects and/or calibration phantoms are simulated; and
analytical modeling, wherein at least one subject and/or calibration phantom is modeled.

13. The nuclear imaging device according to claim 6, wherein the predetermined model distributions are obtained from at least one of:
an experimental calibration procedure;
Monte Carlo simulations; and
analytical modeling.

14. The nuclear imaging device of claim 6, wherein the nuclear imaging device is a positron emission tomography (PET) device and the evaluation apparatus is further programmed to:
determine lines of response (LORs) between the most likely photo conversion positions of coinstantaneous valid gamma radiation events and reconstructing an image based on the LORs.

15. The nuclear imaging device according to claim 6 wherein:
said scintillator also emits pile-up events, and
said threshold value is effective to discriminate between valid gamma radiation events and invalid gamma radiation events comprising said pile-up events and said inter-crystal Compton scatter events.

16. A method for evaluating gamma radiation events detected by a gamma camera and identifying valid gamma radiation events, said gamma camera including a scintillator for emitting scintillation photons at photo conversion positions in the scintillator in response to incident gamma rays and resulting gamma radiation events and a position-sensitive photodetector for detecting emitted scintillation
comparing an obtained spatial signal distribution with predetermined model distributions for different possible photo conversion positions in the scintillator and determining therefrom the likelihood function for said different possible photo conversion positions, the predetermined model distributions being obtained from Monte Carlo simulations; and photons and obtaining therefrom a spatial signal distribution, said method comprising:

selecting the most likely photo conversion position based on the maximum value of said likelihood function for said different possible photo conversion positions and determining whether said maximum value of the likelihood function fulfils a predetermined selection criterion indicating whether the evaluated gamma radiation event is a valid gamma radiation event, said predetermined selection criterion being a comparison with a threshold value that is defined as a quantile of a distribution of maximum likelihood values of different valid gamma radiation events in a calibration data set, the calibration data set is obtained from Monte Carlo simulations, wherein a number of different subjects and/or calibration phantoms are simulated.

17. A method for nuclear imaging, comprising:
emitting scintillation photons at photo conversion positions in the scintillator in response to incident gamma rays and resulting gamma radiation events;
detecting emitted scintillation photons and obtaining therefrom a spatial signal distribution ; and
the evaluation method according to claim 16.

18. A non-transitory computer readable medium storing instructions executable by a computer to carry out the steps of the methods as claimed in claim 16.

19. The method according to claim 16, further comprising:
determining lines of response (LORs) between the most likely photo conversion positions of coinstantaneous valid gamma radiation events and reconstructing an image based on the LORs.

20. The method of claim 16 wherein said threshold value is effective to discriminate between valid gamma radiation events and invalid gamma radiation events comprising pile-up events and inter-crystal Compton scatter events.

* * * * *